H. COTTRELL.
PRESS FOR MOLDING ARTIFICIAL FUEL.

No. 170,713. Patented Dec. 7, 1875.

UNITED STATES PATENT OFFICE.

HERBERT COTTRELL, OF NEWARK, NEW JERSEY.

IMPROVEMENT IN PRESSES FOR MOLDING ARTIFICIAL FUEL.

Specification forming part of Letters Patent No. 170,713, dated December 7, 1875; application filed May 31, 1875.

*To all whom it may concern:*

Be it known that I, HERBERT COTTRELL, of Newark, in the county of Essex and State of New Jersey, have invented an Improved Machine for Pressing and Molding Artificial Fuel, and for similar purposes; and I do hereby declare that the following is a full, clear, and exact description of the same, reference being had to the accompanying drawing, forming part of this specification.

My invention relates to a machine for molding into blocks artificial fuel composed of coal-dust and some adhesive substance, or for molding other plastic substances, in which the molds are formed in halves on two cylinders revolving toward each other, and provided with plungers for expelling the contents of the molds.

The invention consists in a novel arrangement and mode of operating the plungers, whereby their operation is rendered more accurate and effective.

Figure 1:
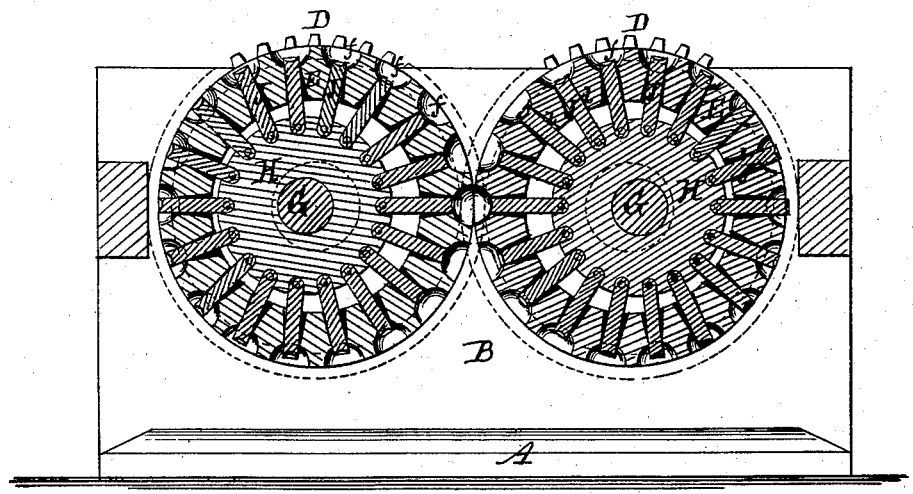
Figure 2:
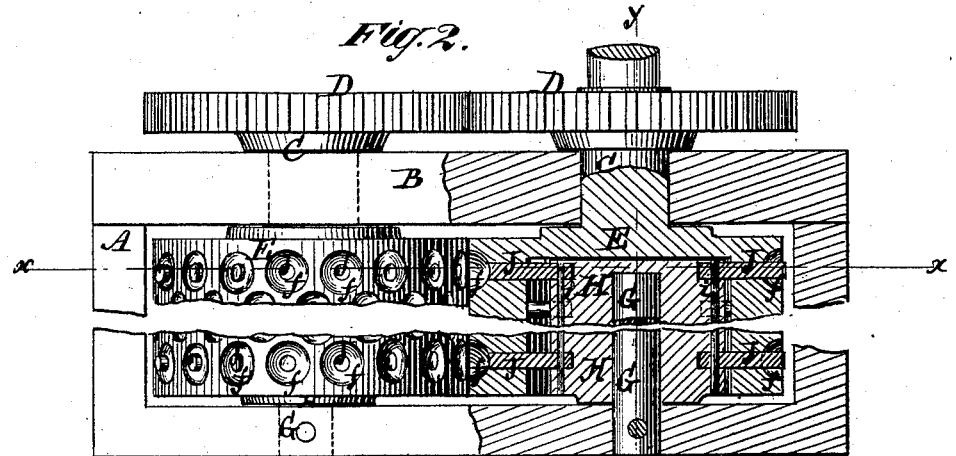
Figure 3:
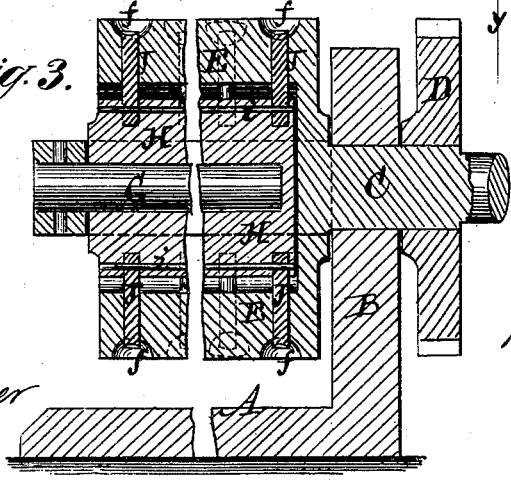

In the accompanying drawing, Figure 1 is a vertical section of a machine constructed according to my invention, taken in the line $x\,x$ of Fig. 2. Fig. 2 is a top view, partly in horizontal section. Fig. 3 is a vertical section, taken in the line $y\,y$ of Fig. 2.

A represents the base, from which rises a standard, B, in which is journaled two horizontal shafts, C C, to one of which the driving-power is applied. On the shafts C C are gear-wheels D D, which mesh into each other, so as to cause the shafts to revolve toward each other. Each of the shafts C C carries a cylinder, E, in which is formed one-half of the molds $f$. The shafts C may be of any suitable length, and may have bearings for their other ends, and the cylinders E may be of any suitable width, and may have any desired number of molds arranged side by side; but for convenience I have represented the shaft C as having but one bearing. The cylinders are arranged so as to revolve with their faces in close contact with each other, so that when the two halves of each mold come together they form a close joint. The halves of the molds $f$ are shown as being hemispherical in form; but they may be of any other suitable shape. The cylinders E are hollow, with the interior surface parallel with the outer surface.

On the side of the frame of the machine, opposite to the side where the gear-wheels are located, are two fixed shafts, G, arranged eccentrically with relation to the shafts C. Surrounding each of the eccentrics G is a ring, H, which is also eccentric with relation to the shaft C and attached cylinder, but concentric on the shaft or eccentric G. The eccentric ring H extends into the hollow cylinder E for nearly or quite the entire length thereof. The diameter of the ring is less than that of the interior of the cylinder, so that when the two rings are in place upon the eccentrics, and inside of the cylinders, they are close to the interior surfaces of the cylinders on the sides which are farthest from each other, while on the sides which are nearest to each other there is a space between the interior surface of the cylinder and the exterior surface of the ring about equal to the depth of one of the molds. To the exterior of the eccentric rings H a number of plungers, J, are attached, corresponding with the number of molds in the cylinders. The plungers are attached by pivots $i$ passing through their inner ends, so as to allow of a slight oscillatory motion. The plungers pass through holes $l$ extending from the bottoms of the molds $f$ in radial directions toward the center of the cylinder E. These holes are represented as tapering in form, so that the outer ends of the plungers J fit them snugly at the bottoms of the molds, but have room to play in the larger portions toward the center. The play of the plungers in the holes may, however, be provided for by making the plungers taper—the holes having parallel sides.

The operation is as follows: The cylinders E being in motion, revolving toward each other, the plastic material to be molded is poured in so as to pass between the faces of the cylinders. As the two halves of the molds come together they press the plastic material between them, and mold it into balls or blocks corresponding with the shape of the molds. At the point where the two halves of a mold are together the plungers belonging to said halves are in a radial position, and are so far withdrawn into the holes $l$ that the outer end of each is flush with the bottom of the mold, in consequence of the eccentric arrangement of the ring with relation to the cylinder, as will be seen by referring to Fig. 1. As soon as the two halves of the mold $f$ have passed the center and begin to separate, the plungers J are caused, by the eccentricity of the rings H, to protrude from the molds and force out the balls or blocks, which drop down below the cylinders, leaving the molds open and clear. The plungers continue to protrude until the cylinders have made a half-revolution, when they are again withdrawn until after passing the center, as before described.

By this arrangement and mode of application of the plungers they are caused to operate upon the contents of the molds simultaneously, and at the exact moment when the molds begin to separate, and their motion is so gradual and so nicely-regulated that the balls or blocks are expelled from the molds without bruising, crushing, or dividing them.

What I claim as new, and desire to secure by Letters Patent, is—

The combination of the eccentric ring H, eccentric G, and plungers J with the cylinder E, substantially as herein shown and described.

HERBERT COTTRELL.

Witnesses:
 BENJAMIN W. HOFFMAN,
 FRED. HAYNES.